(12) United States Patent
Schröder

(10) Patent No.: US 11,258,318 B2
(45) Date of Patent: Feb. 22, 2022

(54) ROTOR WITH ARMATURE BLOCKS FORMED BY PLASTIC ENCAPSULATION WITH ANCHORING ELEMENTS

(71) Applicant: CONTINENTAL AUTOMOTIVE GmbH, Hannover (DE)

(72) Inventor: Lothar Schröder, Karben (DE)

(73) Assignee: Vitesco Technologies GmbH, Hannover (DE)

( * ) Notice: Subject to any disclaimer, the term of this patent is extended or adjusted under 35 U.S.C. 154(b) by 294 days.

(21) Appl. No.: 16/304,661

(22) PCT Filed: May 8, 2017

(86) PCT No.: PCT/EP2017/060933
§ 371 (c)(1),
(2) Date: Nov. 26, 2018

(87) PCT Pub. No.: WO2017/202593
PCT Pub. Date: Nov. 30, 2017

(65) Prior Publication Data
US 2020/0336030 A1    Oct. 22, 2020

(30) Foreign Application Priority Data

May 25, 2016 (DE) .......................... 102016209174.3

(51) Int. Cl.
*H02K 1/27* (2006.01)
*H02K 1/276* (2022.01)
(Continued)

(52) U.S. Cl.
CPC ............. *H02K 1/2773* (2013.01); *H02K 1/28* (2013.01); *H02K 15/02* (2013.01); *H02K 15/12* (2013.01);
(Continued)

(58) Field of Classification Search
CPC ........ H02K 1/2773; H02K 1/28; H02K 1/276; H02K 1/27; H02K 1/2766; H02K 1/30;
(Continued)

(56) References Cited

U.S. PATENT DOCUMENTS

2 A * 7/1836 Goulding ................. D06C 3/00
57/58.49
4,445,062 A * 4/1984 Glaser ................. H02K 1/2773
310/156.59
(Continued)

FOREIGN PATENT DOCUMENTS

CN         1295370       5/2001
CN      201499035 U      6/2010
(Continued)

OTHER PUBLICATIONS

Office Action dated Dec. 5, 2019 issued in Korean Patent Application No. 10-2018-7035803.
(Continued)

*Primary Examiner* — Maged M Almawri
(74) *Attorney, Agent, or Firm* — Cozen O'Connor

(57) ABSTRACT

A rotor for use in an electric motor, and to a method for producing a rotor of this kind. The rotor includes a plurality of armature sections, a plurality of magnets, a rotor core and a plastic encapsulation. The rotor core is formed by the plastic encapsulation from plastic. The armature sections are formed as individual armature blocks which are anchored in the rotor core at least by an anchoring element on their inner side that faces a rotor center axis.

17 Claims, 5 Drawing Sheets

(51) Int. Cl.
    *H02K 1/28*           (2006.01)
    *H02K 15/02*         (2006.01)
    *H02K 15/12*         (2006.01)
    *H02K 21/12*         (2006.01)
    *H02K 15/03*         (2006.01)

(52) U.S. Cl.
    CPC ............. *H02K 21/12* (2013.01); *H02K 1/276* (2013.01); *H02K 15/03* (2013.01); *H02K 2201/15* (2013.01)

(58) Field of Classification Search
    CPC ........ H02K 15/02; H02K 15/12; H02K 15/03; H02K 2201/15; H02K 21/12
    USPC ...................................... 310/43–45
    See application file for complete search history.

(56) References Cited

U.S. PATENT DOCUMENTS

| | | | | |
|---|---|---|---|---|
| 6,392,324 | B1* | 5/2002 | Kuwahara | H02K 1/2773 310/156.11 |
| 6,703,741 | B1* | 3/2004 | Ifrim | H02K 1/2773 310/156.19 |
| 8,018,110 | B2* | 9/2011 | Alexander | H02K 1/2773 310/156.56 |
| 9,935,508 | B2* | 4/2018 | Schneider | H02K 1/28 |
| 10,033,235 | B2* | 7/2018 | Bouarroudj | H02K 1/28 |
| 10,036,393 | B2* | 7/2018 | Cavagnaro | F02B 37/10 |
| 10,069,357 | B2* | 9/2018 | Ekin | H02K 1/30 |
| 10,177,616 | B2* | 1/2019 | Ekin | H02K 1/2773 |
| 10,199,892 | B2* | 2/2019 | Ekin | H02K 1/2773 |
| 10,284,064 | B2* | 5/2019 | Li | H02K 21/14 |
| 10,566,864 | B2* | 2/2020 | Firat | H02K 1/278 |
| 2002/0109422 | A1* | 8/2002 | Hatton | H02K 7/085 310/67 R |
| 2004/0004407 | A1* | 1/2004 | Laurent | H02K 1/2773 310/156.48 |
| 2005/0001503 | A1* | 1/2005 | Hans | H02K 1/2766 310/156.53 |
| 2006/0061227 | A1* | 3/2006 | Heideman | H02K 1/2773 310/156.56 |
| 2007/0085437 | A1* | 4/2007 | Heideman | H02K 1/2773 310/156.59 |
| 2012/0181880 | A1* | 7/2012 | Zhao | H02K 1/2773 310/43 |
| 2012/0326548 | A1* | 12/2012 | Nonaka | H02K 1/28 310/156.19 |
| 2013/0187506 | A1* | 7/2013 | Lee | H02K 1/28 310/156.12 |
| 2013/0221787 | A1* | 8/2013 | Kritharidou | H02K 1/28 310/154.14 |
| 2015/0162791 | A1* | 6/2015 | Woo | H02K 1/2773 310/156.56 |
| 2015/0244218 | A1* | 8/2015 | Kaufmann | H02K 1/2773 310/156.58 |
| 2015/0303751 | A1* | 10/2015 | Ekin | H02K 1/30 310/43 |
| 2018/0119626 | A1* | 5/2018 | Wightman | H02K 21/16 |
| 2019/0027981 | A1* | 1/2019 | Hong | H02K 1/12 |
| 2019/0058366 | A1* | 2/2019 | Firat | H02K 1/28 |

FOREIGN PATENT DOCUMENTS

| | | |
|---|---|---|
| CN | 202721586 U | 2/2013 |
| CN | 103219812 | 7/2013 |
| CN | 203387314 U | 1/2014 |
| CN | 104393730 | 3/2015 |
| DE | 1563040 | 4/1970 |
| DE | 10219190 | 11/2003 |
| DE | 10 2010 061 778 | 5/2012 |
| DE | 102010061778 | 5/2012 |
| DE | 10 2013 000 404 | 7/2013 |
| DE | 10 2012 221 422 | 5/2014 |
| EA | 014510 B1 | 12/2010 |
| EP | 2793365 | 10/2014 |
| EP | 2892128 | 7/2015 |
| JP | 3482365 | 12/2003 |
| KR | 20130131659 | 12/2013 |
| KR | 20160017636 | 2/2016 |

OTHER PUBLICATIONS

Office Action dated Mar. 26, 2021 issued in Chinese Patent Application No. 201780031675.4.

* cited by examiner

ROTOR WITH ARMATURE BLOCKS FORMED BY PLASTIC ENCAPSULATION WITH ANCHORING ELEMENTS

CROSS REFERENCE TO RELATED APPLICATIONS

This is a U.S. national stage of application No. PCT/EP2017/060933, filed on May 8, 2017. Priority is claimed on German Application No. DE102016209174.3, filed May 25, 2016, the content of which is incorporated here by reference.

BACKGROUND OF THE INVENTION

1. Field of the Invention

The present invention relates to a rotor for use in an electric motor, and to a method for producing a rotor of this kind.

2. Description of the Prior Art

DE 10 2012 221 422 A1 discloses a rotor of an electric motor that has a laminated armature core made up of a large number of stamped metal sheets. This laminated armature core firstly is fitted with magnets arranged in a manner distributed over the circumference and secondly constitutes the linking element to a shaft by which a torque is to be transmitted. Accordingly, this laminated armature core ensures the mechanical strength. The arrangement comprising the laminated armature core and the individual magnets is further encapsulated with a plastic.

SUMMARY OF THE INVENTION

One object of the present invention is to provide an improved rotor, provide protection for an electric motor, an actuator comprising an electric motor of this kind, and a vehicle comprising an actuator of this kind and/or an electric motor of this kind, and a method for producing a rotor of this kind.

One aspect of the invention proposes a rotor for use in an electric motor, wherein the rotor has a plurality of armature sections, a plurality of magnets, a rotor core and a plastic encapsulation.

In this case, the rotor core is formed by plastic encapsulation from plastic. As a result, the radial, metal connecting sections to the shaft as provided according to the prior art, such as in DE 10 2012 221 422 A1 for example, are dispensed with. The plastic of the rotor core therefore ensures the mechanical strength.

In this case, the armature sections are formed as individual armature blocks, wherein the armature blocks are anchored in the rotor core at least by an anchoring element in each case on their inner side, which faces a rotor center axis. In this case, the anchoring elements forms a solid interlocking connection to the encapsulated plastic. The armature blocks, which can be made up of a large number of stamped metal sheets, can expediently be of identical design in this case.

Since the radial, metal connecting sections to the shaft, such as in DE 10 2012 221 422 A1, are dispensed with, magnetic flux in a rotor of said kind also improves because the rotor core is instead formed from a plastic, because a connecting section does not negatively influence the magnetic flux. Furthermore, the proposed, individual armature blocks can advantageously be configured for the purpose of optimum magnetic flux.

According to one embodiment, the armature blocks and the magnets are individually and alternately put together to form a substantially annular arrangement. In this case, a magnet can expediently be arranged between two adjacent armature blocks.

As an alternative, this annular arrangement can also be described such that it can be subdivided into individual segments of a circle, wherein either an armature block or a magnet is associated with each of these segments of a circle.

As is known, according to the prior art, receiving sections are provided in said laminated armature core arranged in a manner distributed over the circumference, it being possible for the magnets to be inserted into said receiving sections and in the process to be scratched.

According to a further embodiment, damage of this kind is avoided because, when a rotor of this kind is being installed, the armature blocks and the magnets are individually and advantageously alternately put together one after the other to form the annular arrangement. In turn, this also facilitates magnetic flux in the rotor.

This will be explained further in the following text as part of the description of the proposed production method for a rotor of said kind.

According to a further embodiment, at least one end side is further formed by the plastic encapsulation. The end side, together with the rotor core, forms a supporting and integral injection-molded structure. The at least one end side augments fixing of the magnets on the rotor core, the plastic of the rotor core expediently extending as far as the individual magnets and therefore also fixing the individual magnets.

According to a further embodiment, individual injection-molded sections are also formed by the plastic encapsulation, the individual injection-molded sections filling slots arranged on the outer side of the rotor and covering the slots with respect to the outside. In this case, the slots are formed by in each case two adjacent armature blocks in conjunction with the magnet arranged between them, wherein the injection-molded sections, together with the rotor core and the end side, form the supporting and integral injection-molded structure. These individual injection-molded sections augment fixing of the magnets on the rotor core and the at least one end side. These individual injection-molded sections can further be formed in such a way that they terminate flush with the outer faces of the respective armature blocks and/or the at least one end side.

The anchoring elements, which are formed on the individual armature blocks can be of eyelet-like form, for example in the shape of a half-ring or in the shape of a substantially formed full ring. In addition or as an alternative to this, the anchoring elements can also have other configurations which are covered for example by the term "eyelet-like", for example a partially circular form. However, other anchoring forms or anchoring geometries are also conceivable in principle, for example including rib-like anchoring elements, which protrude into the plastic body of the rotor core. A combination of eyelet-like anchoring forms together with other anchoring forms is also conceivable, for example in the shape of pin- and/or hook-like anchoring forms. All of these various anchoring forms ensure a secure interlocking connection to the encapsulated plastic and therefore secure anchoring of the individual armature blocks with the plastic body of the rotor core. Provided that a secure interlocking connection of said kind is ensured, the anchoring form or anchoring geometry can be formed in any desired manner.

For assembly and/or production purposes, the armature blocks each have at least one cutout in the longitudinal direction of the annular arrangement, wherein the cutout can extend from end side to end side of the armature block, that is to say that the cutout passes through the armature block in the longitudinal direction of said armature block. In addition or as an alternative to this, a cutout of this kind could also extend over a partial length of the armature block, that is to say only partly into the armature block. In this case, the cutout can be arranged substantially centrally on the armature block.

According to a further embodiment, two adjacent armature blocks, on the mutually facing sides, have at least in each case one lug radially on the outer and inner side with respect to the annular arrangement, said lugs surrounding and fixing the magnet, which is arranged therebetween.

In this case, the lugs extend in the longitudinal direction of the annular arrangement in each case at least over a longitudinal section of the associated armature block or, as an alternative to this, over the entire length of the associated armature block.

In this case, the individual armature blocks are formed at least from a stamped metal sheet, preferably made up of a large number of stamped metal sheets of this kind. However, the armature blocks can also be formed from a solid material in principle. In each case, a corresponding sheet-metal section or a corresponding form of the individual armature blocks can be designed to optimize the magnetic flux since the connection to a shaft is ensured by the plastic rotor core.

For the purpose of saving weight, the rotor core can have cutouts arranged in a manner distributed over the circumference, it expediently being possible for said cutouts to extend over the entire length of the rotor core, that is to say from end side to end side of the rotor core. In addition or as an alternative to this, at least one cutout of said kind can also extend over a partial length of the rotor core, that is to say only partly into the rotor core. In this case, these cutouts can expediently be distributed uniformly over the circumference and spaced apart uniformly in relation to one another.

The end side of the rotor can also have cutouts that are arranged in a manner distributed over the circumference in the region of or level with the armature blocks and the magnets, wherein some of these cutouts in the end side can correspond to the cutouts in the armature blocks, that is to say that these cutouts in the end side can be substantially in alignment with the cutouts in the armature blocks. This results in a saving in material when encapsulating the annular arrangement.

One aspect of the invention further proposes an electric motor for use in an actuator and/or in a vehicle, wherein the electric motor has a rotor of the above-described type.

One aspect of the invention further proposes an actuator comprising an electric motor of the above-described type, for example for use in electric oil pumps, cooling water pumps, clutch actuators, and/or transmission actuators. Use in a throttle valve actuator, for example, is also conceivable.

One aspect of the invention also proposes a vehicle comprising an actuator and/or an electric motor of the above-described type.

One aspect of the invention furthermore proposes a method for producing a rotor of the above-described type, in which method, in a first step, armature sections formed as individual armature blocks and individual magnets are put together by an assembly table to form a substantially annular arrangement.

In a second step, a supporting plastic structure is further added by a plastic encapsulation. In this case, a rotor core is formed from plastic, the armature blocks being anchored in said rotor core at least by anchoring elements in each case on their inner side which faces a rotor center axis.

In this case, the individual armature blocks are placed onto fixing pins, which are fitted in the assembly table, by dedicated cutouts provided specifically for said individual armature blocks, for fixing purposes. This renders possible the subdivision, already described above, of the annular arrangement into individual segments of a circle which are associated with either an armature block or a magnet.

In this case, the fixing pins, in respect of their cross-sectional shape, expediently correspond at least substantially to the cutouts in the respectively associated armature blocks, wherein the cutouts in the armature blocks can be of, for example, a slit-like form.

According to one embodiment, the individual armature blocks and magnets are alternately put together to form the annular arrangement. This facilitates magnetic flux in a rotor of said kind.

According to a further embodiment, the individual armature blocks and magnets are alternately put together one after the other to form the annular arrangement. Insertion of the individual magnets between two adjacent armature blocks is avoided in this way. Therefore, damage to the magnet surfaces, as occurs in the prior art, is also avoided. In turn, this also facilitates magnetic flux in the rotor.

According to a further embodiment, a magnet is arranged between two adjacent armature blocks. Subsequent corrosion is avoided in this way.

In principle, the magnets can be magnetized either before installation or, as an alternative, after installation.

At least one end side is further formed during the plastic encapsulation, said end side, together with the rotor core, forming a supporting and integral plastic structure. The at least one end side augments fixing of the magnets on the rotor core.

Individual injection-molded sections are further formed during the plastic encapsulation, said individual injection-molded sections filling slots on the outer side of the rotor, the slots being formed by in each case two adjacent armature blocks in conjunction with the magnet which is arranged between them, and covering said slots with respect to the outside. In this case, the respective injection-molded sections, together with the rotor core and the end side, form the supporting and integral plastic structure. These individual injection-molded sections augment fixing of the magnets on the rotor core and the at least one end side. These individual injection-molded sections can further be formed in such a way that they terminate flush with the outer faces of the respective magnets with respect to the annular arrangement.

According to a further embodiment, the assembly table can be formed, in principle, in a manner split into two or more parts in order to premount two or more assembly table parts with individually put-together armature blocks and magnets in a complementary manner, wherein the premounted assembly table parts are then put together to form the annular arrangement.

The ultimately formed plastic structure can be formed, in principle, so as to terminate flush with the respective outer faces of the armature blocks in order to avoid protrusions. In addition, a shaft and/or a hub can also be encapsulated when forming the plastic structure.

Finally, after curing of the plastic structure, in a third and last step, the rotor is removed from the fixing pins of the assembly table and then withdrawn from a correspondingly used injection mold.

BRIEF DESCRIPTION OF THE DRAWINGS

The invention will be explained in detail in the following text with reference to the illustrations in the figures. Further advantageous developments of the invention can be gathered from the dependent claims and the following description of preferred embodiments.

In the drawings:

FIG. 1 shows a rotor 1 of an electric motor for use in an actuator and/or for use as a drive for, for example, an oil and/or cooling water pump, an electrical brake force boosting arrangement, a variable valve drive, a clutch actuator and/or a transmission actuator, and the like. The rotor 1, which can comprise a shaft, not illustrated here, for insertion into a receptacle A, is formed by injection molding in this case. The rotor 1 has, by way of example, an arrangement of a total of ten armature blocks 2 and ten magnets 3. In principle, it should be noted at this point that the number of armature blocks 2 and magnets 3 can be arbitrary—depending on the design of a motor. The individual armature blocks 2 constitute laminated armature cores or armature sections that are made up of a large number of stamped metal sheets.

In this case, the armature blocks 2 and the magnets 3 are individually and alternately put together to form a substantially annular arrangement (cf. FIG. 2). In this case, in each case one magnet 3 is arranged between two adjacent armature blocks 2.

Figure 1:
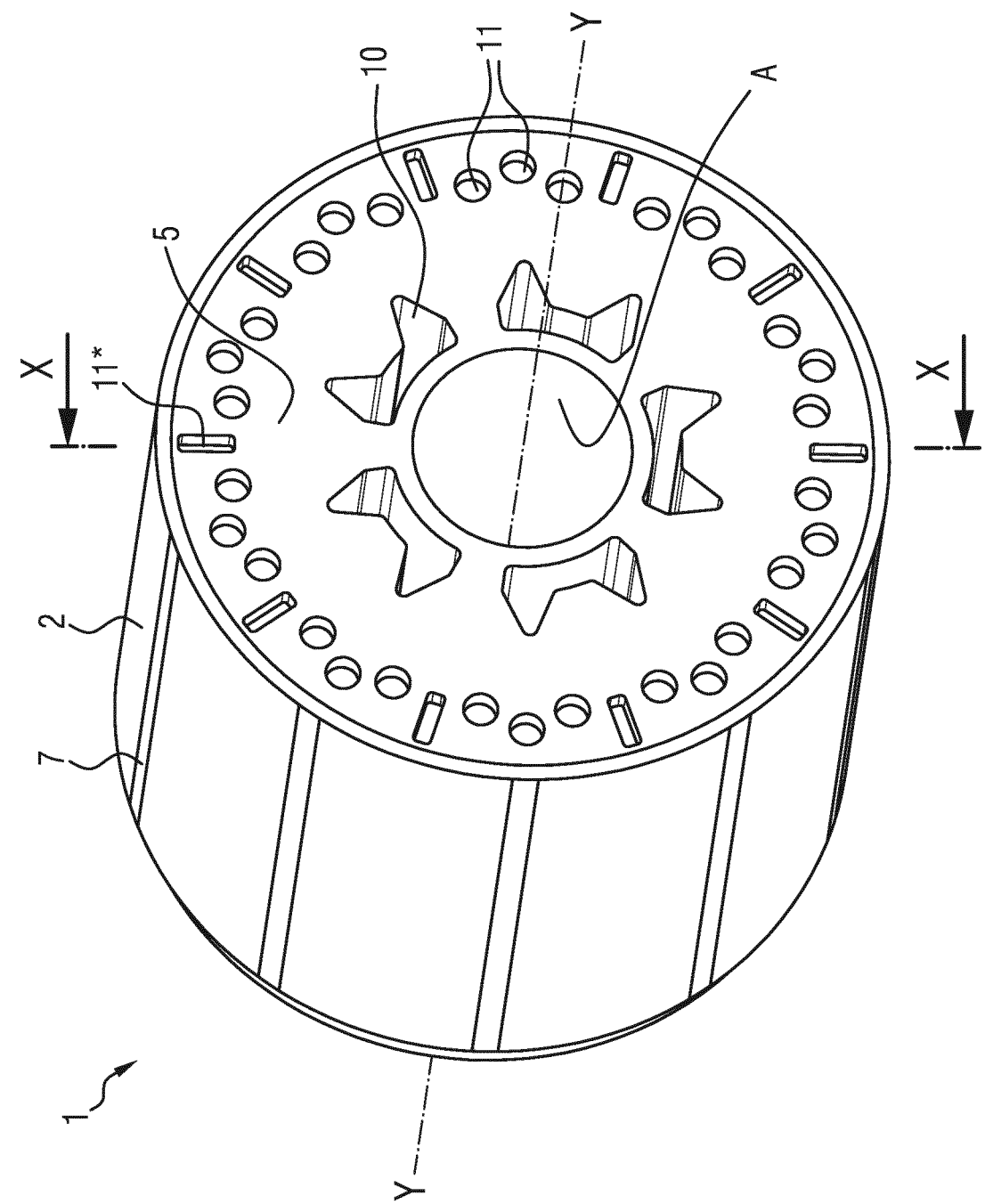
FIG. 1 is a perspective illustration of a rotor with a supporting plastic structure formed by injection molding.

A lug 9 is formed in each case radially on the outer and inner side with respect to the annular arrangement on the mutually facing sides of two adjacent armature blocks 2, the lug surrounding and fixing the respectively associated magnet 3. In this case, the individual lugs 9 are bevelled on the inner side, wherein they taper in the circumferential direction of the annular arrangement 15. This simplifies the process of putting together the armature blocks 2 and the magnets 3 during assembly. In this case, the individual lugs 9 extend over the entire length of the respectively associated armature block 2.

Figure 2:
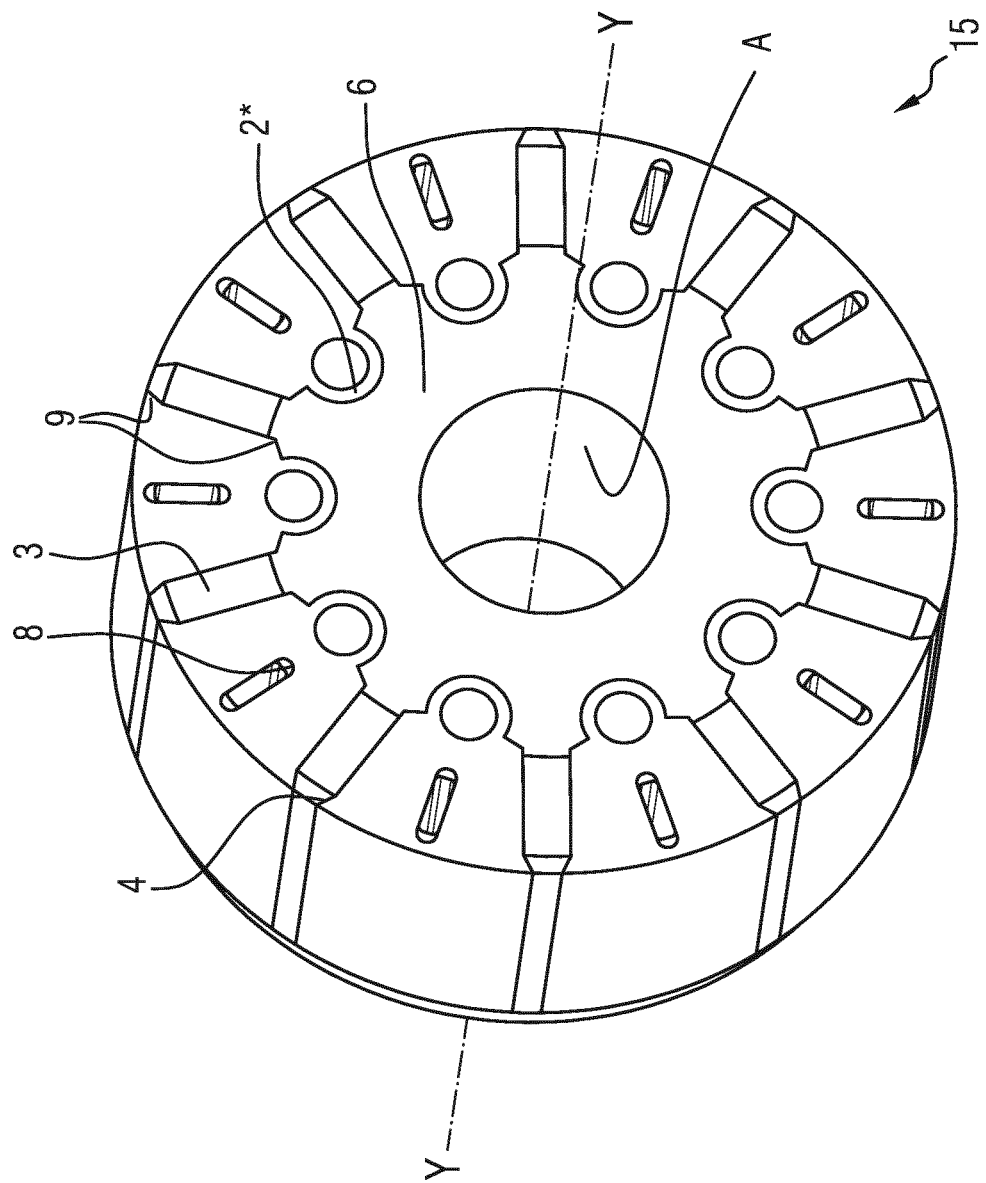
FIG. 2 is a sectional illustration, along line X-X, of the rotor illustrated in FIG. 1.
Figure 3:
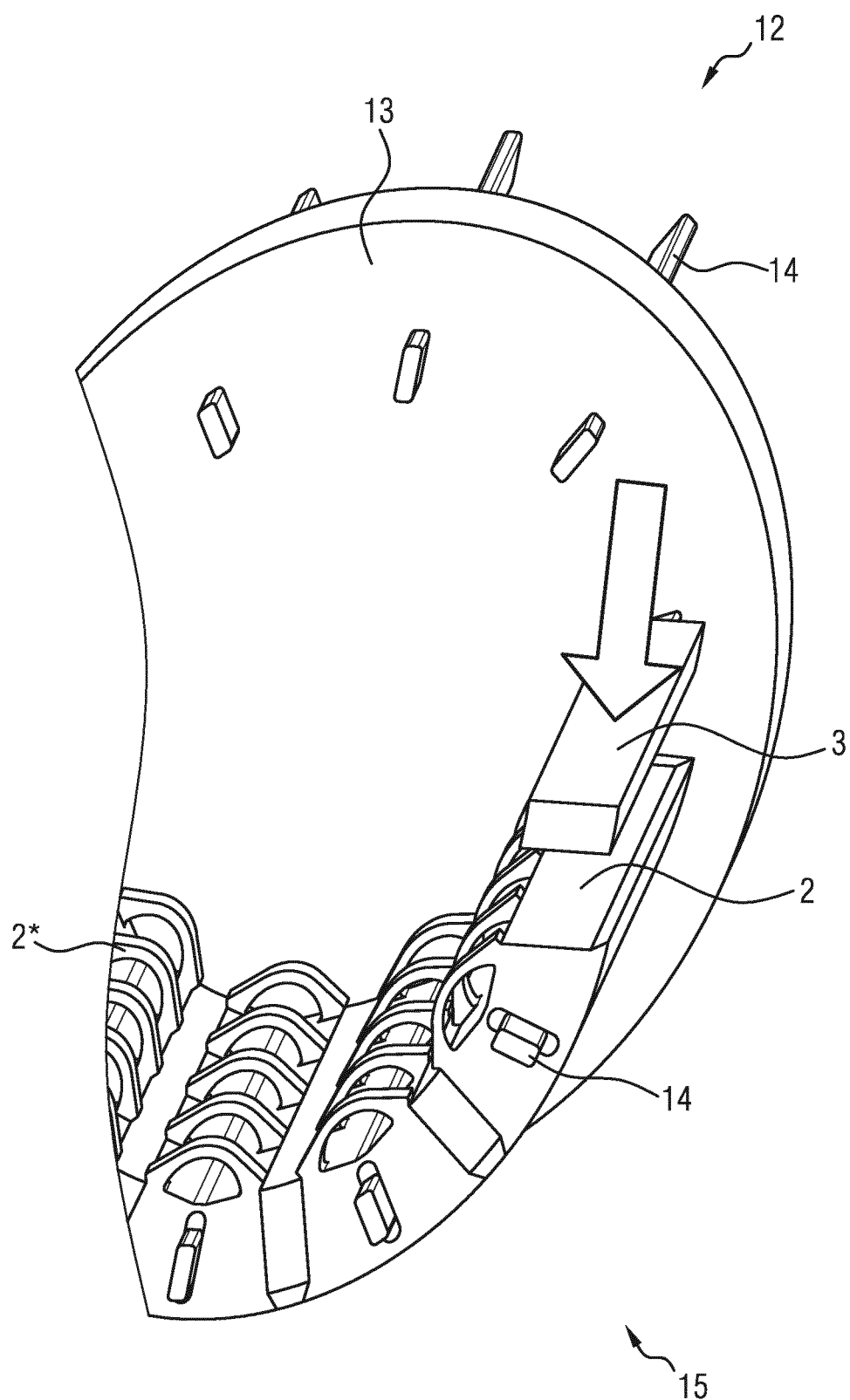
FIG. 3 is a first assembly table with armature blocks and magnets.

Overall, the individual armature blocks 2 have, on the inner side thereof which faces the rotor center axis Y-Y, a plurality of anchoring arrangements 2* which are of eyelet-like form in the shape of full rings which are fixedly anchored in the rotor core 6 or the injection-molded compound of the rotor core 2 (FIG. 2). These anchoring arrangements 2* are arranged in a manner distributed at equal distances in relation to one another over the length of the armature block 2 in the longitudinal direction (Y-Y) of the rotor 1. As an alternative to this, these anchoring elements 2* can also be formed in a partially circular manner or in an arcuate manner (cf. FIG. 3, FIG. 4, FIG. 5). In FIG. 3, a total of five eyelet-like anchoring arrangements 2* are provided on each of the armature blocks 2. In the encapsulated state of the rotor 1 (FIG. 1, FIG. 2, FIG. 5), all of these anchoring arrangements 2* are surrounded or passed through by the plastic compound or injection-molding compound of the rotor core 2, so that they form a solid interlocking connection with the rotor core 6.

Each individual armature block 2 has a cutout 8 that serves for assembly purposes and arranged substantially centrally on the armature block 2 and is of slit-like form. This cutout 8 serves to receive a so-called fixing pin 14, which will be discussed further in the following text in connection with an assembly or production method.

The rotor core 6 comprises a total of five cutouts 10 that are arranged in a manner distributed over the circumference (FIG. 1) in order to save weight. In this case, these cutouts 10 are expediently arranged in a manner spaced apart uniformly in relation to one another.

The rotor 1 further comprises two end sides 5 formed by injection molding and, together with the encapsulated rotor core 6, form a supporting and integral injection-molded structure. These two end sides 5 additionally fix the individual magnets 3 in addition to the plastic compound of the rotor core 6, which plastic compound itself already has a fixing action and extends as far as the individual magnets 3. These two end sides 5 further have a uniform pattern of cutouts 11, 11* in each case in the region of or level with the armature blocks 2 and the magnets 3, said cutouts serving to reduce weight. In this case, some of these cutouts 11* correspond to the cutouts 8 in the armature blocks 2, through which cutouts in each case one of the fixing pins 14 extends for assembly purposes (cf. FIG. 3, FIG. 4).

The slots 4 that are formed on the outer side of the rotor 1 between in each case two adjacent armature blocks 2 and by the two armature blocks 2 and the magnets 3 which are arranged therebetween, are also filled by the injection-molding compound (FIG. 1, FIG. 2). In this case, the individual injection-molding sections 7, which cover the respective slots 4 with respect to the outside, are integrally connected to the encapsulated rotor core 6 and the two encapsulated end sides 5, and are therefore a constituent part of the supporting injection-molded structure. These individual injection-molding sections 7 additionally fix the individual magnets 3 in the radial direction in addition to the plastic compound of the rotor core 6 and the two end sides 5, which plastic compound itself already has a fixing action.

In this exemplary embodiment, the supporting injection-molded/plastic structure is formed to terminate flush with the respective outer faces of the armature blocks 2 to avoid projections.

Figure 5:
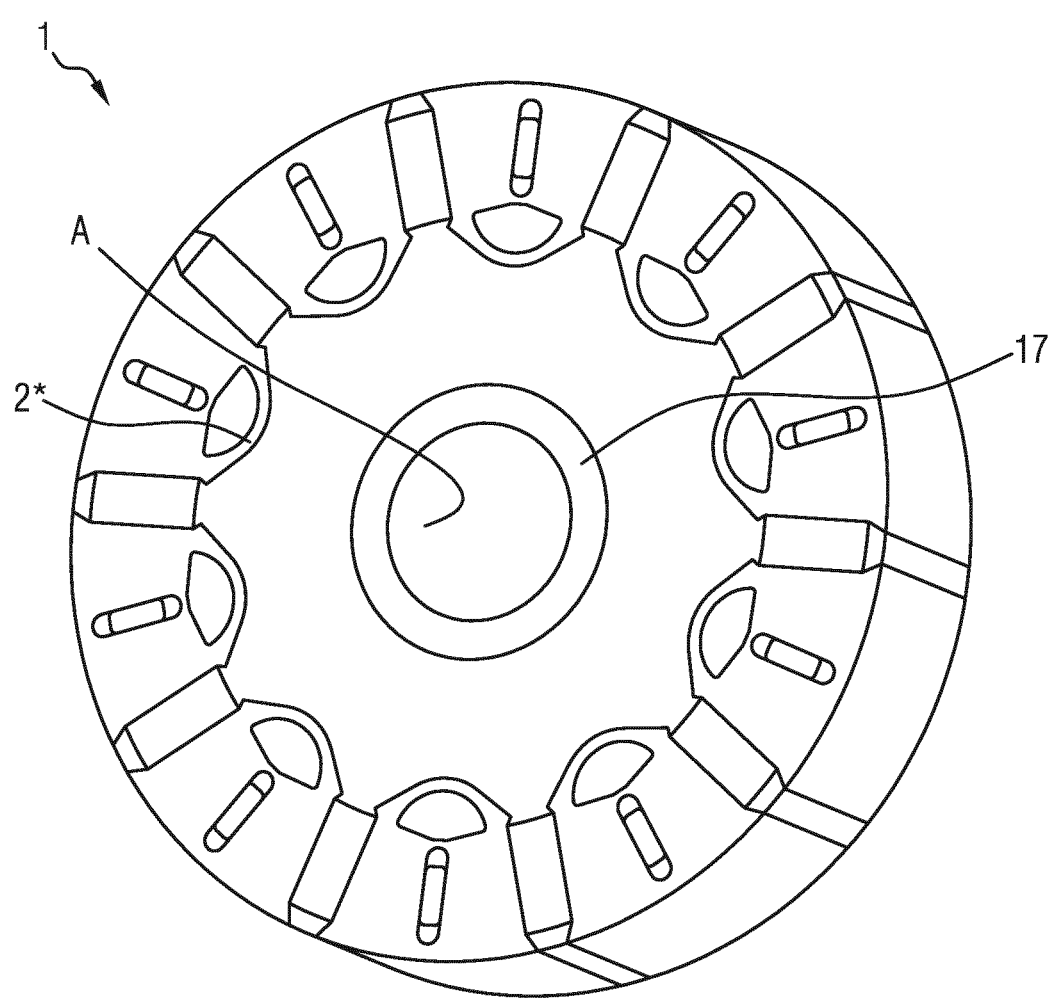
FIG. 5 is a further perspective illustration of a rotor with a supporting plastic structure formed by injection molding.

The abovementioned shaft, which can be inserted into the receptacle A, can also be encapsulated during the plastic encapsulation, that is to say that the injection-molded structure is fitted directly onto the shaft (FIG. 1, FIG. 2). As an alternative to this, a hub 17, which forms the receptacle A for the shaft, can also be encapsulated too (FIG. 5). However, as an alternative, a hub 17 can also be subsequently pressed with the injection-molded structure or the rotor core 6. In turn, the hub 17 can then be connected, for its part, to the shaft in an interlocking or force-fitting manner.

In the exemplary embodiments shown, a total of ten armature blocks 2 and ten magnets 3, by way of example, are used for producing the rotor 1. The number of armature blocks and magnets used can be freely selected in principle.

In a first step, the individual armature blocks 2 and the individual magnets 3 are alternately put together in succession using a, for example, rotatable assembly table or revolver table 12 to form a substantially annular arrangement 15. In this case, the individual armature blocks 2 are placed onto fixing pins 14, which are mounted in a mounting plate 13 to fix and hold the armature blocks on the assembly table, by dedicated cutouts 8, which are provided specifically for said individual armature blocks. In principle, it is advantageous to put together the individual armature blocks 2 and the individual magnets 3 one after the other because this ensures protected installation of the magnets 3, without the magnet surfaces being scratched. As an alternative to this, the individual armature blocks 2 can also be pre-mounted and the magnets 3 can then be inserted or pushed into the receiving gaps formed. However, this would have the disadvantage that the magnet surfaces could be scratched, as a result of which corrosion in a rotor 1 of said kind is facilitated.

In this case, the individual magnets 3, which are fitted one after the other, are surrounded and fixed by two adjacent armature blocks 2 by the lugs 9. Each of these magnets 3 is arranged between two adjacent armature blocks 2.

In a second step, the supporting injection-molded structure is now added by an injection-molding process or a plastic encapsulation, the supporting injection-molded structure comprising the rotor core 6 and passing through and surrounding the individual anchoring elements or anchoring arrangements 2* in the shape of eyelet-like or actuate anchoring arrangements. As a result, the injection-molded structure and the annular arrangement 15 are therefore fixedly connected to one another and can no longer be detached from one another without being destroyed. The individual anchoring arrangements 2* form a fixed interlocking connection with the plastic of the rotor core 6.

In one embodiment, the supporting injection-molded structure comprises the rotor core 6 that extends as far as the armature blocks 2 and the magnets 3, wherein the individual armature blocks 2 are fixedly anchored in the rotor core 6 by the associated anchoring arrangements 2*. In this embodiment, the rotor core 6 supports the armature blocks 2 directly and the magnets 3 both directly and also indirectly (cf. FIG. 2, FIG. 5).

A supporting injection-molded structure of this kind that provides a rotor core 6 composed of plastic, with no metal connecting sections or laminated armature core sections for the shaft being formed on said rotor core as in the prior art, improves magnetic flux in a rotor of said kind because there are no losses in magnetic flux which, as is known, are caused on the part of this metal connecting section.

In a further embodiment, the supporting injection-molded structure comprises both the rotor core 6 and also two end sides 5 and also injection-molded sections 7, which are formed on the outer side of the rotor 1, for covering the slots 4, which are formed in each case between two adjacent armature blocks 2 in conjunction with the magnets 3 situated or arranged therebetween (FIG. 1, FIG. 2, FIG. 5). In this case, these injection-molded sections 7 terminate flush with the outer side of the armature blocks 2.

Figure 4:
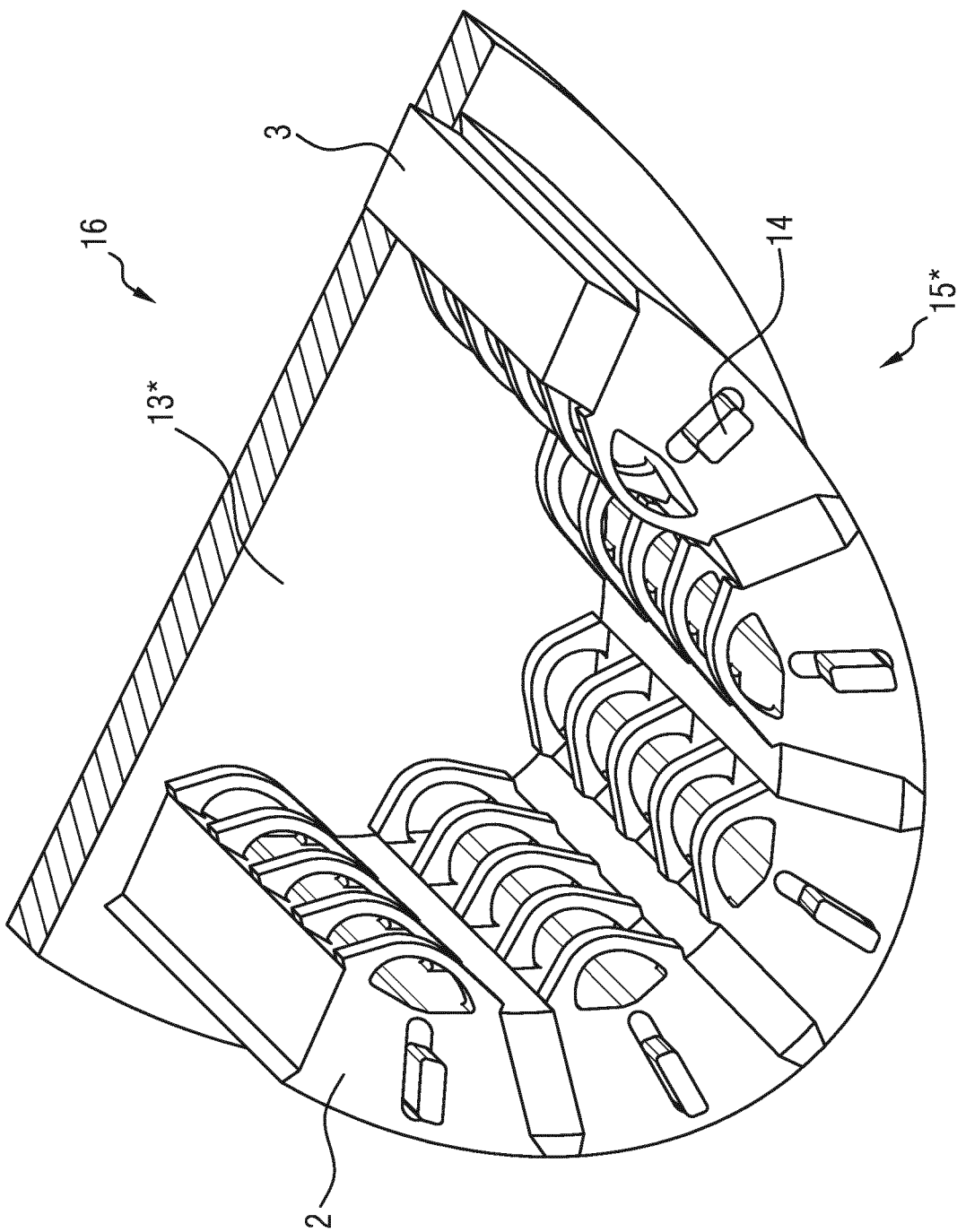
FIG. 4 is a second assembly table with armature blocks and magnets.

In principle, the assembly table 12, 16 can also be designed, for example, in a manner split into two (FIG. 3, FIG. 4). In this case, the two assembly table halves 16 may also each be a rotatable assembly table or revolver table (FIG. 4). In this case, two separate mounting plates 13*, which are each fitted with five fixing pins 14, are populated with the armature blocks 2 and the magnets 3 in the above-described manner. This therefore results in two pre-mounted assembly table halves 16, each with a complementary, semicircular arrangement 15* of armature blocks 2 and magnets 3 (FIG. 4), wherein the two assembly table halves 16 are finally put together in the first step to form the annular arrangement 15. In a second step, the supporting injection-molded structure is then added to the annular arrangement. In this case, the hub 17 for receiving the shaft can also be potted (FIG. 5).

Following the injection-molding process and after the plastic compound has solidified, in a third and final step, the rotor 1 can then be removed from the fixing pins 14 of the mounting plate 13, 13* and withdrawn from a correspondingly used injection mold.

The above-described rotor 1 as part of an electric motor is proposed within the scope of this application for use in various pump drives, for example of a motor vehicle. However, in principle, a rotor 1 of said kind as part of an electric motor is also suitable for a wide variety of other uses.

Although exemplary embodiments have been discussed in the above description, it should be noted that numerous modifications are possible. Furthermore, it should be noted that the exemplary embodiments are merely examples which are not intended to limit the scope of protection, applications and structure in any way. Rather, the above description will provide a person skilled in the art with a guideline for implementing at least one exemplary embodiment, wherein various modifications, in particular with regard to the function and arrangement of the described constituent parts, may be made without departing from the scope of protection as defined by the claims and by these equivalent combinations of features.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A rotor of an electric motor, comprising
a plastic encapsulation;
a plurality of armature sections formed as individual armature blocks;
a plurality of magnets;
a rotor core formed by the plastic encapsulation from plastic; and
a plurality of anchoring elements configured to anchor each of the individual armature blocks in the rotor core and arranged on a respective inner side that faces a rotor center axis,
wherein the plurality anchoring elements arranged on a respective armature block are axially spaced apart from each other, and
wherein one or more of the plurality anchoring elements has a contour configured to be permanently fixed by the plastic encapsulation forming the rotor core.

2. The rotor as claimed in claim 1, wherein each anchoring element is eyelet-like.

3. The rotor as claimed in claim 1, wherein each of the armature blocks is formed from a plurality of stamped metal sheets, which are put together to form the armature block.

4. The rotor as claimed in claim 1, wherein the rotor core has cutouts arranged in a manner distributed over the circumference.

5. The rotor as claimed in claim 1, wherein the contour of each of the plurality of anchoring elements is D-shaped, defining a recess into which the plastic encapsulation forming the rotor core passes and anchors each individual armature block to the rotor core.

6. The rotor as claimed in claim 1, wherein the armature blocks and the magnets are individually and alternately put together to form a substantially annular arrangement.

7. The rotor as claimed in claim 6, wherein a one of the plurality of magnets is arranged between two adjacent armature blocks.

8. The rotor as claimed in claim 1, wherein at least one end side is further formed by the plastic encapsulation, and, an end side, together with the rotor core, forming a supporting and integral injection-molded structure.

9. The rotor as claimed in claim 8, further comprising:
individual injection-molded sections formed by the plastic encapsulation, the individual injection-molded sections configured to fill slots which are arranged on an outer side of the rotor and covering the slots with respect to the outside,
wherein the slots are formed by in each case two adjacent armature blocks in conjunction with the magnet which is arranged between them,
wherein the injection-molded sections, together with the rotor core and the end side, form the supporting and integral injection-molded structure.

10. The rotor as claimed in claim 1, wherein two adjacent armature blocks, on mutually facing sides, have at least in each case one lug radially on the outer and inner side with respect to the annular arrangement, the lug surrounding the magnet, which is arranged therebetween.

11. The rotor as claimed in claim 10, wherein the lugs extend in the longitudinal direction of the annular arrangement in each case at least over a longitudinal section of the armature block, over an entire length of the armature block.

12. The rotor as claimed in claim 1, wherein the armature blocks each have a cutout that extends in a longitudinal direction of the annular arrangement at least one of:
over a partial length of the armature block, and
over an entire length of the armature block.

13. The rotor as claimed in claim 12, wherein the cutout is arranged substantially centrally on the armature block.

14. The rotor as claimed in claim 12, wherein the end side of the rotor has cutouts arranged distributed over the circumference in a region of the armature blocks and of the magnets, wherein one or more of the cutouts in the end side correspond to the cutouts in the armature blocks.

15. An electric motor for use in a throttle valve actuator for an internal combustion engine, wherein the electric motor has a rotor, comprising
a plastic encapsulation;
a plurality of armature sections formed as individual armature blocks;
a plurality of magnets;
a rotor core formed by the plastic encapsulation from plastic; and
a plurality of anchoring elements configured to anchor each of the individual armature blocks in the rotor core and arranged on a respective inner side that faces a rotor center axis,
wherein the plurality anchoring elements arranged on a respective armature block are axially spaced apart from each other, and
wherein one or more of the plurality anchoring elements has a contour configured to be permanently fixed by the plastic encapsulation forming the rotor core.

16. An actuator comprising an electric motor, wherein the electric motor has a rotor, comprising
a plastic encapsulation;
a plurality of armature sections formed as individual armature blocks;
a plurality of magnets;
a rotor core formed by the plastic encapsulation from plastic; and
a plurality of anchoring elements configured to anchor each of the individual armature blocks in the rotor core and arranged on a respective inner side that faces a rotor center axis,
wherein the plurality anchoring elements arranged on a respective armature block are axially spaced apart from each other, and
wherein one or more of the plurality anchoring elements has a contour configured to be permanently fixed by the plastic encapsulation forming the rotor core.

17. A vehicle comprising at least one of an actuator and/or an electric motor, wherein the at least one of the actuator and/or an electric motor has a rotor, comprising
a plastic encapsulation;
a plurality of armature sections formed as individual armature blocks;
a plurality of magnets;
a rotor core formed by the plastic encapsulation from plastic; and
a plurality of anchoring elements configured to anchor each of the individual armature blocks in the rotor core and arranged on a respective inner side that faces a rotor center axis,
wherein the plurality anchoring elements arranged on a respective armature block are axially spaced apart from each other, and
wherein one or more of the plurality anchoring elements has a contour configured to be permanently fixed by the plastic encapsulation forming the rotor core.

* * * * *